US008512815B2

(12) United States Patent
Girotra

(10) Patent No.: US 8,512,815 B2
(45) Date of Patent: Aug. 20, 2013

(54) PROCESS FOR WOOD ACETYLATION AND PRODUCT THEREOF

(75) Inventor: Kapil Girotra, Oosterbeek (NL)

(73) Assignee: Titan Wood Limited, Windsor (GB)

( * ) Notice: Subject to any disclaimer, the term of this patent is extended or adjusted under 35 U.S.C. 154(b) by 163 days.

(21) Appl. No.: 12/865,571

(22) PCT Filed: Jan. 30, 2009

(86) PCT No.: PCT/GB2009/000268
§ 371 (c)(1),
(2), (4) Date: Sep. 27, 2010

(87) PCT Pub. No.: WO2009/095687
PCT Pub. Date: Aug. 6, 2009

(65) Prior Publication Data
US 2011/0045268 A1    Feb. 24, 2011

(30) Foreign Application Priority Data

Feb. 1, 2008   (GB) .................................. 0801880.6
Aug. 13, 2008  (GB) .................................. 0814785.2
Dec. 18, 2008  (GB) .................................. 0823012.0

(51) Int. Cl.
*B27K 3/08*     (2006.01)
*B05D 1/18*     (2006.01)

(52) U.S. Cl.
USPC ........ 427/440; 427/430.1; 427/439; 427/297; 427/238

(58) Field of Classification Search
USPC ......................................................... 427/439
See application file for complete search history.

(56) References Cited

U.S. PATENT DOCUMENTS

| 3,094,431 | A | * | 6/1963 | Goldstein et al. ............. 427/254 |
| 3,183,114 | A |   | 5/1965 | Liu et al. |
| 3,720,661 | A | * | 3/1973 | Breton et al. .................. 536/69 |
| 4,804,384 | A | * | 2/1989 | Rowell et al. ..................... 8/121 |
| 5,525,721 | A | * | 6/1996 | Ohshima et al. ................ 536/69 |
| 2004/0258941 | A1 | * | 12/2004 | Neogi et al. ............... 428/537.1 |

FOREIGN PATENT DOCUMENTS

| EP | 213252 A  | * | 3/1987 |
| EP | 0213252 A |   | 3/1987 |
| EP | 680810 A1 | * | 11/1995 |
| EP | 0746570 B1 |   | 11/2000 |
| EP | 1491305 A |   | 12/2004 |
| GB | 1023465 A |   | 3/1966 |
| JP | 62-064501 |   | 3/1987 |
| JP | 63-199604 |   | 3/1995 |
| WO | 9523168 A |   | 8/1995 |

OTHER PUBLICATIONS

Van Acker, "Assessing Performance Potential of Modified Wood focussing on Dimensional Stability and Biological Durability," European Conference on Wood Modification, 2003, p. 153-168.
ASTM Standard D143, 2007, "Standard Test Methods for Small Clear Specimens of Timber," ASTM International, West Conshohocken, PA, DOI: 10.1520/D0143-09.
Beckers, E.P.J., H.P.M. Bongers, M.E. van der Zee, & C. Sander, "Acetyl Content Determination using Different Analytical Techniques," European Conference on Wood Modification, 2003, p. 83-102.
British Standard BS EN 408, 2003, "Timber structures—Structural timber and glued laminated timber—Determination of some physical and mechanical properties," BSI, London, England, ICS 91.08020.
ACCSYS Technologies; Placing and Admission to AIM; Oct. 26, 2005; Available at http://www.accsysplc.com/admin/News/Docs/accsys_aim_press_17_10_05.pdf [accessed Sep. 14, 2009].
ACCOYA (RTM); Improved Dimensional Stability; Available at http://www.titanwood.com/dimesional-stability.html [accessed 14 Sep. 2009].
Great Britain Intellectual Property Office; Search Report Dated Apr. 28, 2009 for GB0901554.6.
Great Britain Intellectual Property Office; Search Report Dated Sep. 17, 2009 for GB0901554.6.
International Search Report, Dated Jul. 5, 2009, for International Patent Application PCT/GB2009/000268, filed on Jan. 30, 2009.
Notification Concerning Transmittal of International Preliminary Report on Patentability; International Preliminary Report on Patentability, Dated Aug. 12, 2010, for International Patent Application PCT/GB2009/000268, filed on Jan. 30, 2009.
Office Action Dated Feb. 8, 2013 Issued by the European Patent Office for European Patent Application No. 09706379.6, filed Oct. 19, 2010.

* cited by examiner

*Primary Examiner* — David Turocy
(74) *Attorney, Agent, or Firm* — Vic Y. Lin; Joseph G. Chu; Innovation Capital Law Group, LLP

(57) ABSTRACT

A process for the acetylation of wood comprising submerging the wood in an acetylation fluid under pressure, and subsequently heating the wood under controlled conditions to initiate two distinct exothermic reactions. The process permits the simultaneous upgrading of large quantities of commercial wood sizes having a natural durability class 4 or class 5 to a unique product of durability class 1 or class 2.

24 Claims, No Drawings

PROCESS FOR WOOD ACETYLATION AND PRODUCT THEREOF

The present invention relates to the modification of components of wood, and in particular the modification of solid, non-durable wood species by acetylation, to improve desirable characteristics such as durability, dimensional stability, stability to ultraviolet light and thermal conductivity. Non-durable wood species are generally considered to be the soft wood derived from coniferous trees, and non-durable hardwoods such as described in BRE durability classes 4 and 5 (see below).

The benefits of acetylating solid soft woods, solid non-durable hardwoods and wood veneers (hereinafter referred collectively to wood) have been extensively studied on a laboratory scale and documented in academic and trade publications. Broadly defined, wood acetylation results in the conversion of hydroxyl groups in wood components to acetyl groups. This chemical modification thus has the effect of converting hydrophilic hydroxyl groups to hydrophobic acetyl groups.

Prior art documentation has mostly focused on improvements in the durability and dimensional stability of small pieces of wood primarily for laboratory investigations and are of little commercial significance. Durability is essentially the resistance of wood to natural rotting processes, such as those brought on by fungi, while dimensional stability can be described as a reduction in swelling and shrinkage when wood is subjected to cycles of wetting by water, or by humidity, followed by drying.

In early wood acetylation work (Forest Products Journal, February 1964, page 6, Goldstein, Dreher and Cramer), acetic anhydride was dissolved in diluents, such as xylene and toluene, to assist in the penetration of ponderosa pine, sugar maple and white oak. The applicability of this technique to commercially used sizes of wood, where cross-grain penetration is essential in terms of durability and dimensional stability, is not addressed. Moreover, the by-product streams were mixtures of difficult to separate blends of acetic anhydride, acetic acid and xylene.

The processes described in European patent 213 252 are principally directed to the acetylation of wood fibres and chips, and not to commercial sizes of wood. The examples given for solid wood are of the application of the processes on a laboratory scale to very small pieces.

European patent 680810 attempts to address the acetylation of solid wood of commercial dimensions, but in doing so relies on an impregnation by acetic anhydride in the absence of effective control over the reaction heat that is generated in the wood. Temperatures in the wood can therefore rise to levels which can cause internal cracking and charring, significantly reducing the strength of the acetylated wood. EP 680810 also relies on the characterising step of post treating the acetylated wood with steam. The applicants have found this to be largely ineffective in removing residual acetic acid.

International patent publication WO 2005/077626 is concerned almost exclusively with the acetylation of oven-dried wood, meaning it is free of all but traces of moisture. While this process may be applicable to the short lengths of wood used in the reported experiments, oven-dried wood is essentially unknown in the commercial world, primarily due to the damage caused by severe drying of commercial lengths, eg 2 to 4 meters. The application of super-heated acetylation fluid to commercial wood sizes, typically containing 12 to 20% moisture, results in a rapid generation of heat further increasing the high temperature of the acetylation fluid and driving the overall temperature inside the wood to levels which can cause cracking and charring of the internal structure of the wood.

A specific shortcoming of the prior art generally is so-called 'envelope treatment'. This is illustrated in "Acceptance Criteria for Acetylated Wood Preservative Systems"-Document No AC297 published by ICC Evaluation Services 1 Mar. 2005. Envelope treatment is the acetylation of wood near its surface, leaving the interior wood at an ineffective level of acetylation or with no acetylation at all. Wood acetylated to an ineffective depth can be exposed directly to moisture when the acetylated piece is planed, profiled or cross-cut. Acetylated wood allows moisture to pass into and out of the entire cross section. In the properly acetylated parts, moisture encounters protected cell walls and cannot be used to support fungal growth. In poorly acetylated or unacetylated parts, moisture adheres to the cell walls where it assists wood-rotting fungi. The net result of moisture reaching such parts is that the wood rots from the interior outwards.

Other common wood preservation treatments involve the use of chromated copper arsenate (CCA), quaternary copper salts, pentachlorophenol, and creosote, but unlike acetylation, these treatments are carried out at ambient temperature and do not involve exothermic reactions.

Publications on wood acetylation generally deal with the fundamental chemistry and the properties of the wood obtained. These publications provide little guidance on how to achieve volumetric efficiency in the wood acetylation reaction, little guidance on how to initiate the reaction except by the crude application of heat, little guidance on how to dissipate the heat generated by exothermic reactions and no guidance on how to profile the temperature around a multiplicity of wood pieces stacked in a reactor so that uniform acetylation is obtained in every piece and throughout every piece and for every piece in the reactor.

Much of the work appearing in the literature and in earlier patent documents is relevant solely to the durability and dimensional stability of small, laboratory prepared samples of wood. These studies are essentially silent on the incorporation, or the achievement, of these desirable properties when larger wood sizes, such as would be commonly used in the building industry and trades, are acetylated.

Thus, the technical problem to be solved is the uniform penetration of wood pieces of commercial sizes by acetic anhydride using only the penetration achieved perpendicular to the grain and the management of reaction heat. Failure to manage heat within the wood, especially at the core will, at minimum, result in strength reduction(s) in the acetylated wood or in partial acetylation. At worst, it will result in the outright charring of the wood due to unreleased reaction heat. Not only must heat management be applied uniformly throughout the cross-section of each wood piece, it must be applied uniformly to the entire length of each piece and equally to each piece in a reactor.

Wood durability is achieved by protecting the cell wall from fungal growth, which, in turn, requires the conversion of hydroxyl groups to acetyl groups. This must be done in a uniform fashion across the entire wood piece.

Dimensional stability is achieved by swelling the kiln-dried wood back to its green volume without exceeding the elastic limits of the cell wall. Again, this must be done uniformly across the entire wood piece.

Thus, the present invention provides a process for the acetylation of wood comprising the steps: —
 (a) in a reaction pressure vessel submerging wood having a moisture content of 6% to 20% by weight in an acetylation fluid at a temperature of 10° C. to 120° C.

(b) increasing the pressure in the vessel to 2 to 20 bar for a period of 10 to 300 minutes
(c) removing excess acetylation fluid from the vessel
(d) introducing into the vessel an inert fluid, circulating and heating the fluid until the internal temperature of the wood begins to show an exotherm, controlling the supply of heat to the wood until the exotherm is complete and maintaining the internal temperature of the wood below 170° C.
(e) heating the circulating fluid to a temperature of 85° C. to 150° C. for a time of 10 to 30 minutes to initiate a second exothermic reaction, controlling the supply of heat to the wood until the exotherm is complete and maintaining the internal temperature of the wood below 170° C.
(f) removing the circulating fluid and allowing the acetylated wood to cool to ambient temperature.

In (a) the moisture content of the wood is preferably less than 12% by weight, and desirably less than 8% by weight. The acetylation fluid may comprise 60% to 95% by volume of acetic anhydride and 5% to 40% by volume acetic acid. Preferably, the fluid comprises 80% to 92% by volume acetic anhydride and 8% to 20% by volume acetic acid. Desirably, the acetylation fluid is at a temperature of 35° C. to 55° C.

In (b) the pressure in the vessel is preferably increased to 10 to 15 bar for 30 to 90 minutes, depending on the permeability and dimensions of the wood to be treated. Pressurisation with nitrogen is preferred but other inert gases, such as carbon dioxide, may also be used.

In (c) by excess is meant acetylation fluid which has not impregnated the wood. It may be removed from the pressure vessel by using existing pressure within the vessel, eg nitrogen gas, to force the fluid into a storage vessel, or by pumping the fluid out while maintaining a nitrogen pressure in the vessel.

In (d) the inert fluid (i.e. a fluid which does not react with acetic anhydride or acetic acid) is typically gaseous nitrogen, gaseous carbon dioxide or flue gas, which is heated to a temperature of from 20° C. to 120° C. The commencement, duration and completion of the exotherm is detected and monitored by thermocouples located in the wood. In some instances, the gaseous fluid, eg nitrogen, may be partially or fully saturated with non-inert acetic anhydride and/or acetic acid. This can range from 20% to full saturation (100%).

In (d) and (e) it may be necessary to cool the circulating fluid to avoid the internal temperature of the wood (detected by thermocouples) exceeding 170° C., preferably not exceeding 155° C.

In (e) the preferred circulating fluid temperature is 100° C. to 135° C., and the preferred time 10 to 15 minutes.

During the cooling of the acetylated wood residual acetic anhydride and acetic acid by-product may be removed, for example, by evaporation under vacuum.

In some process circumstances it is preferred to reduce the moisture content of the wood to be acetylated, by first introducing the wood into the pressure vessel and reducing the pressure therein to, for example, 0.05 to 0.5 bar for 10 to 300 minutes, preferably 30 to 120 minutes, depending upon the permeability of the wood, before submerging the "dried" wood in an acetylation fluid. The vacuum is conveniently released by allowing the acetylation fluid to enter the reaction vessel.

The present invention is of particular value in the acetylation of commercial sized wood pieces, resulting in acetylated wood with uniform and predictable properties. The invention is especially applicable to wood pieces to be acetylated to at least 14% by weight acetyl at their geometrical centre which have a width of from 2 cms to 30 cms, a thickness of from 2 cms to 16 cms, and a length of from 1.5 meters to 6.0 meters. Preferably, the wood pieces have a width of from 2 cms to 10 cms, a thickness of from 2 cms to 10 cms, and a length of from 1.5 meters to 4.0 meters.

It is an important characteristic of the acetylated wood of the present invention that it retains essentially all its original strength and appearance. It is common for wood acetylation processes described in the prior art to result in treated wood having a darkened or discoloured surface, which can significantly detract from the aesthetic appearance of the product. In the present invention, such a result is a rare occurrence, and should it occur, can readily be removed by planning, sanding or profiling. Other benefits that have been recognised are superior wet stiffness, dimensional stability and machine workability.

In cases where the wood to be acetylated has a high moisture content, a low permeability, or a high density, it may be necessary for a second impregnation with an acetylation fluid followed by a second acetylation, to achieve the desired acetyl levels (steps (a) to (f)—page 4). In such cases, partially acetylated wood according to the present invention, still partially wet with acetic anhydride and acetic acid, has been found to take up more acetylation fluid than expected, and can do so without the action of hydrocarbon diluents to assist in penetration or acting as a carrier fluid.

The present invention also provides acetylated wood having unique, ie not hitherto known or attainable, wet stiffness (modulus of elasticity) and wet strength (modular of rupture). In the case of radiata pine, unacetylated samples were found to have a dry stiffness of approximately 10540 $N/mm^2$ and a wet stiffness of the order of 6760 $N/mm^2$, ie a loss of 36% in dry stiffness, whereas for the same pine after acetylation the corresponding results for stiffness were 10602 $N/mm^2$ and 9690 $N/mm^2$, a loss of stiffness of less than 10%, namely 8.6% (reference BS EN 408:2006—British Standards Institute—BSI). Also, the acetylated wood can possess significantly improved dimensional stability in terms of radial and tangential shrinkage, when compared with unacetylated wood (methods for the measurement of radial and tangential shrinkage in wood are well documented). See Table 1 below, where very little shrinkage has occurred in the acetylated samples.

TABLE 1

| Wood Sample | Radial Shrinkage* | $R_2/R_1$ | Tangential Shrinkage* | $T_2/T_1$ |
|---|---|---|---|---|
| Radiata Pine | | | | |
| unacetylated | $R_1$ 1.2 | 0.33 | $T_1$ 2.2 | 0.32 |
| acetylated 20% | $R_2$ 0.4 | | $T_2$ 0.7 | |
| Scots Pine | | | | |
| unacetylated | $R_1$ 1.0 | 0.30 | $T_1$ 2.4 | 0.29 |
| acetylated 20% | $R_2$ 0.3 | | $T_2$ 0.7 | |
| Beech | | | | |
| unacetylated | $R_1$ 1.2 | 0.58 | $T_1$ 2.5 | 0.44 |
| acetylated 20% | $R_2$ 0.7 | | $T_2$ 1.1 | |

*at 60% to 90% relative humidity

Preferably, acetylated wood pieces have a starting width of 2 cms to 30 cms, a thickness of from 2 cms to 16 cms, and a length of from 1.5 meters to 6.0 meters. Desirably, the wood pieces have a starting width of from 2 cms to 10 cms, a thickness of 2 cms to 10 cms, and a length of from 1.5 meters to 4.0 meters.

The present invention also offers the unique prospect of the simultaneous upgrading of large quantities of commercial wood sizes having a natural durability class 4 or class 5 to durability class 1 or class 2. Reference the widely recognised "five-level" wood species durability grading devised by the Building Research Establishment Ltd, Garston, United Kingdom, and published in BRE Digest 296, 1985 (replaced by Digest 429, 1998): —

Class 1 is termed as "very durable", ie 25 years, or more, of in-ground contact with minimal loss of strength or mass. Example: teak, robinia Class 2 is termed as "durable", ie greater than 15 years but less than 25 years of in-ground contact with minimal loss in strength or mass. Example: American white oak, western red cedar.

Class 3 is termed as "moderately durable", ie greater than 10 years but less than 15 years of in-ground contact with minimal loss of strength or mass. Example: European larch, sapele Class 4 is termed as "non-durable", ie greater than 5 years but less than 10 years of in-ground contact with minimal loss of strength or mass. Example: radiata pine, yellow pine, Douglas fir.

Class 5 is termed as "perishable", ie up to 5 years of in-ground contact with minimal loss of strength or mass. Example: poplar, European beech.

By improving the durability of plantation grown soft woods the acetylated wood of the present invention can be substituted for tropical wood, and for wood treated with toxic chemicals such as arsenic, copper, chromium and pentachlorophenol. In addition to the commercial advantages, the benefits to the environment are self-evident, namely, a reduction in the use of native tropical hard woods and the avoidance of treatments employing toxic chemicals.

A significant advantage of the present invention is the drying of the acetylated wood using the same circulating inert fluid used in the acetylation reaction. The fluid (when gaseous) is passed through condensers where a mixture of acetic acid by product and residual acetic anhydride may be removed.

Another significant advantage of the current invention is that the liquid mixture condensed from the circulating inert fluid is free from water, high-boiling point wood extracts and debris, thus avoiding the need for an expensive recovery process.

At least two options are available for recycling the recovered liquid mixture. One is to flash distil the liquid to effect a crude separation of the acetic acid from the anhydride. The recovered acetic acid may then be fed to a ketene cracker, and the recovered acetic anhydride recycled to the wood acetylation process.

A second option is to distil acetic acid from the recovered liquid, and sell it as technical grade acid. The unused acetic anhydride collected in the condensate is then returned to the wood acetylation process.

The present invention uses high-pressure liquid chromatography (HPLC) to quantify the acetate ion concentration resulting from the saponification of the acetyl groups. This gives a direct measure of acetyl content rather than general weight gain. And, it can be applied to small areas of each acetylated piece. In addition, calibrated Fourier transform infrared spectrophotometers (FTIR) and near infrared spectrophotometers (FTNIR) can be used to measure the acetyl content of slices of wood that are 2 mm in thickness and 4 mm×2 mm in area. This allows confirmation of acetylation on pinpoint sized spots and allows the gradient of acetylation across individual pieces to be viewed.

The following examples are intended only to illustrate the present invention. They are not to be taken as limiting the invention in any way.

EXAMPLE 1

About 0.4 $M^3$ of rough-sawn, radiata pine boards from Chile, with 11% moisture, were separated with 15 mm stickers vertically and horizontally. The boards were 3.9 meters long×55 mm thick by 130 mm wide and composed of largely sapwood with some heartwood. The wood was loaded into a 2.5 cubic meter liquid capacity reaction pressure vessel. The vessel was equipped with a gas circulation loop.

Optionally, a vacuum was applied to the boards. In the present example the vacuum was 0.1 to 0.2 bar absolute, and was applied for 30 minutes. Acetylation fluid (90% acetic anhydride and 10% acetic acid at ambient temperature) was used to release the vacuum and submerge each board. Nitrogen was used to increase the pressure to 10 bar absolute and held for 90 minutes. The free liquid was drained leaving the saturated boards containing 1.5 to 1.7 kilograms of liquid per kilogram of wood.

Nitrogen gas, saturated with acetic anhydride, was used as the heating media for the acetylation reaction. The purpose of saturating the gas with acetic anhydride is to avoid evaporation of acetylation fluid at the wood's surface before and during acetylation. The circulating loop had a volume of four cubic meters, which when combined with the volume of the reactor, provided approximately six cubic meters of gas for 0.4 M3 of wood. During the acetylation cycle, the pressure in gas circulation loop varied between 1.1 to 1.9 bar absolute.

When the temperature of the circulating gas reached approximately 60° C., the reaction between the acetic anhydride and the moisture in the wood, and the acetylation of the wood, began. This was evidenced by an increasingly rapid rise in temperature measured by thermocouples inserted into several of the boards. Heat generated by this reaction plus some additional heating by the circulating nitrogen increased the temperature inside the wood to 130° C. to 140° C., where the reaction between wood hydroxyl groups and the acetic anhydride began.

During the acetylation period of approximately 90 minutes, it was necessary to condense some of the acetic acid-acetic anhydride vapour to control the pressure and temperature of the circulating gas. The recovered liquid had a composition of approximately 5% acetic anhydride and 95% acetic acid.

At the end of the acetylation period, more of the unused acetic anhydride and the by-product acetic acid were condensed from the circulating gas. The temperature was increased gradually to about 130° C. These actions combined to drive volatile materials to the surface of the boards and evaporate them into the gas stream. The recovered liquid was totally free of water and was composed of 3% to 4% acetic anhydride and 96% to 97% acetic acid.

Finally, the boards are dried to a point where they contained about 15 grams to 30 grams of acetic acid per kilogram of wood. Any surface imperfections were removed by planing, sanding or profiling.

The unused acetic anhydride was available for recovery because no water had been added to the system.

The acetylated boards were found to have acetyl contents of 20 to 21% at the surface and 18 to 20% at the core.

EXAMPLE 2

Approximately 0.4 $M^3$ of rough sawn, southern yellow pine boards, which contain 12% moisture, were separated vertically and horizontally by 15 mm stickers. The boards were 3.9 meters long×40 mm thick by 140 mm wide and composed of sapwood with some heartwood. The wood was loaded into a 2.5 M³ liquid capacity reaction pressure vessel. The reaction vessel was equipped with a gas circulation loop.

Optionally, a vacuum was applied to the boards. In the present example the vacuum was 0.1 to 0.2 bar absolute and was applied for 30 minutes. Acetylation fluid (92% acetic anhydride and 8% acetic acid at ambient temperature) was used to release the vacuum and submerge each board. Nitrogen was used to increase the pressure to 10 bar absolute and held there for 60 minutes. The free liquid was drained leaving the saturated boards containing 1.0 to 1.2 kilograms of liquid per kilogram of wood.

Nitrogen gas, saturated with acetic anhydride vapour, was used as the heating media for the acetylation reaction. The purpose of saturating the gas with acetic anhydride is to avoid evaporation of acetylation fluid at the surface of the wood before and during acetylation. The circulating loop had a volume of 4 M³, which when combined with the volume of the reactor, provided approximately 6 M³ of gas for 0.4 M³ of wood. During the acetylation cycle, the pressure in gas circulation loop varied between 1.1 to 1.9 bar absolute.

When the temperature of the circulating gas reached approximately 80° C., the reaction between acetic anhydride and the moisture in the wood began. This was evidenced by an increasingly rapid rise in temperature measured by thermocouples inserted into several of the boards. A second exotherm from wood acetylation began at approximately 120° C. During this first wood acetylation period, approximately 60 minutes, it was necessary to condense some of the acetic acid and acetic anhydride vapours to control the gas pressure and the temperature of the circulating gas. The recovered liquid had a composition of approximately 10% acetic anhydride and 90% acetic acid.

At the end of the first wood acetylation period, some of the unused acetic anhydride and the by-product acetic acid were condensed from the circulating gas. Vacuum was applied to the reactor to withdraw spent acetylation fluid from the wood. This fluid was pumped out of the reactor and vacuum applied a second time.

A fresh charge of acetylation fluid was used to relieve the vacuum, submerge each board and impregnate the wood for a second time. The composition was 91% acetic anhydride, by weight, and the balance was acetic acid. Nitrogen pressure was applied to approximately 10 bar absolute. After a pressure period of 60 minutes, the excess fluid was pumped from the reactor and the circulation of nitrogen saturated with acetic anhydride started at a pressure of about one bar absolute. The temperature of the saturated nitrogen was increased to about 90° C.

After the second wood acetylation was underway, as evidenced by increasing pressure in the circulating gas and increasing temperatures measured by thermocouples at the core of several boards, no additional heat was applied to the circulating gas. As the pressure increased to 1.5 to 1.8 bar absolute, fluid was condensed from the circulating gas to reduce pressure and/or reduce temperature. The composition of the condensed fluid was 30% to 40% acetic anhydride with the balance being acetic acid.

After the second wood acetylation period of approximately 60 minutes, the temperature of the circulating gas was gradually increased to 130° C. and liquid was condensed from a side stream of the circulating gas.

These actions combined to drive volatile materials to the surface of the boards and evaporate them into the gas stream.

The acetyl content of the boards was formed to vary from 20 to 22% at the surface to approximately 15 to 17% at the core.

A further five examples are detailed in the following table:

| Species | Radiata Pine | Southern Yellow Pine | Beech | Poplar | Mason Pine |
|---|---|---|---|---|---|
| Thickness, mm | 100 | 38 | 25 | 40 | 38 |
| Width, mm | 150 | 145 | 120 | 140 | 145 |
| Length, mm | 4,000 | 3,000 | 2,000 | 4,000 | 3,000 |
| No. boards in reactor | 616 | 2,287 | 4,687 | 1,704 | 2,287 |
| Horizontal space, mm | 50 | 20 | 15 | 15 | 20 |
| Vertical space, mm | 15 | 15 | 15 | 15 | 15 |
| Density, kgs/m³ | 470 | 505 | 540 | 430 | 540 |
| Moisture content, wt % | 10 | 7 | 8 | 7 | 9 |
| Vacuum time, minutes at 0.2 bar (optional step) | 90 | 45 | 60 | 35 | 90 |
| Weight of acetylation fluid delivered to reactor, MT | 120 to 125 | 120 to 125 | 124 to 128 | 120 to 125 | 120 to 125 |
| Temperature of acetylation fluid at delivery time, ° C. | 25 | 28 | 28 | 25 | 30 |
| Acetic anhydride concentration in acetylation fluid, wt % | 91 | 86 | 92 | 92 | 88 |
| Acetic acid concentration in acetylation fluid, wt % | 9 | 14 | 8 | 8 | 12 |
| Acetylation time, minutes | 120 | 90 | 100 | 60 | 100 |
| Acetylation pressure, bar | 11 | 15 | 12 | 12 | 10 |
| Temperature in boards at initiation of water reaction, ° C. (first exotherm) | 50 to 60 | 60 to 65 | 60 to 65 | 55 to 65 | 55 to 65 |

-continued

| Species | Radiata Pine | Southern Yellow Pine | Beech | Poplar | Mason Pine |
|---|---|---|---|---|---|
| Temperature in boards at initiation of wood reaction, ° C. (second exotherm) | 120 to 130 | 115 to 135 | 120 to 130 | 115 to 135 | 120 |
| Acetyl content achieved, wt % | 20 to 22 | 17 to 20 | 17 to 19 | 16 to 18 | 14* |
| End use | Window frames | Decking | Cladding | Canal Lining | Decking |

*a second impregnation, similar to the first, increased the acetyl content to 20.5%.

In the two examples using 0.4 M³ of wood and in the five examples using 37 to 40 M³ of wood, acetylated wood was obtained which had Class 1 durability, as measured according to BS EN 350-1:1994 (BSI).

In each of the seven examples, the acetylated wood exhibited improvements in dimensional stability of at least 70%, measured by anti-shrink efficiency, when the samples were cycled between oven dry and 90% humidity.

In each of the seven examples, the UV stability of the acetylated wood showed no measurable degradation in the 16-week accelerated laboratory test described in BS EN 927-6 (BSI) or in one year exterior exposure tests described in BS EN 927-3: 2000 (BSI).

In each of the seven examples, the thermal conductivity of the acetylated wood was reduced by approximately 40% when measured either parallel to the grain or perpendicular to the grain.

The invention claimed is:

1. A process for the acetylation of wood comprising the steps:
   (a) in a reaction pressure vessel submerging wood having a moisture content of 6% to 20% by weight in an acetylation fluid at a temperature of 10° C. to 120°
   (b) increasing the pressure in the vessel to 2 to 20 bar for a period of 10 minutes to 300 minutes
   (c) removing excess acetylation fluid from the vessel by pressurizing with nitrogen gas
   (d) introducing into the vessel an inert fluid, circulating and heating the fluid until the internal temperature of the wood begins to show an exotherm, controlling the supply of heat to the wood until the exotherm is complete and maintaining the internal temperature of the wood below 170° C.
   (e) heating the circulating fluid to a temperature of 85° C. to 150° C. for a time of 10 to 30 minutes to initiate a second exothermic reaction, controlling the supply of heat to the wood until the exotherm is complete and maintaining the internal temperature of the wood below 170° C.
   (f) removing the circulating fluid and allowing the acetylated wood to cool to ambient temperature.

2. A process according to claim 1 wherein the moisture content of the wood is less than 12% by weight.

3. A process according to claim 2 wherein the moisture content of the wood is less 8% by weight.

4. A process according to claim 1 wherein the acetylation fluid comprises 60% to 95% by volume of acetic anhydride and 5% to 40% by volume of acetic acid.

5. A process according to claim 4 wherein the acetylation fluid comprises 80% to 92% by volume of acetic anhydride and 8 to 20% by volume of acetic acid.

6. A process according to claim 1, wherein the acetylation fluid is introduced at a temperature of 35° C. to 55° C.

7. A process according to claim 1, wherein the pressure in the reaction vessel is from 10 to 15 bar for a period of 30 minutes to 90 minutes.

8. A process according to claim 1, wherein the inert fluid in step (d) is selected from gaseous nitrogen, gaseous carbon dioxide or flue gas.

9. A process according to claim 8 wherein the inert gas is heated to a temperature of from 20° C. to 120°.

10. A process according to claim 8, wherein the gaseous nitrogen is partially or fully saturated with non-inert acetic anhydride and/or acetic acid.

11. A process according to claim 10 wherein the saturation is from 20% to 100%.

12. A process according to claim 1, wherein the exotherms are detected and monitored by thermo couples located in the wood.

13. A process according to claim 1, wherein the circulating inert fluid is cooled to avoid the internal temperature of the wood exceeding 170° C.

14. A process according to claim 13 wherein the circulating inert gas is cooled to avoid the internal temperature of the wood exceeding 155° C.

15. A process according to claim 1, wherein during the cooling of the acetylated wood residual acetic anhydride and acetic acid by-product is removed by evaporation under vacuum.

16. A process according to claim 1, wherein the moisture content of the wood is reduced before submerging in acetylation fluid.

17. A process according to claim 16 wherein the moisture content of the wood is reduced by subjecting the wood to a pressure of 0.05 to 0.5 bar for 10 to 300 minutes.

18. A process according to claim 17 wherein the time period is 30 to 120 minutes.

19. A process according to claim 1, wherein the wood is acetylated to at least 14% by weight of acetyl at its geometrical centre.

20. A process according to claim 1, wherein there is a second impregnation with acetylation fluid followed by a second acetylation.

21. A process according to claim 1, for the acetylation of wood pieces having a width of from 2 cms to 30 cms a thickness of from 2 cms to 16 cms and a length of from 1.5 meters to 6.0 meters.

22. A process according to claim 21 wherein the wood pieces have a width of from 2 cms to 10 cms a thickness of from 2 cms to 10 cms and a length of from 1.5 meters to 4.0 meters.

23. A process according to claim 1 by pumping while maintaining a nitrogen gas pressure in the vessel, wherein the acetylated wood is dried using the circulating inert fluid (when gaseous).

24. A process for the acetylation of wood comprising the steps:
   (a) in a reaction pressure vessel submerging wood having a moisture content of 6% to 20% by weight in an acetylation fluid at a temperature of 10° C. to 120°
   (b) increasing the pressure in the vessel to 2 to 20 bar for a period of 10 minutes to 300 minutes
   (c) removing excess acetylation fluid from the vessel by pumping while maintaining a nitrogen gas pressure in the vessel
   (d) introducing into the vessel an inert fluid, circulating and heating the fluid until the internal temperature of the wood begins to show an exotherm, controlling the supply of heat to the wood until the exotherm is complete and maintaining the internal temperature of the wood below 170° C.
   (e) heating the circulating fluid to a temperature of 85° C. to 150° C. for a time of 10 to 30 minutes to initiate a second exothermic reaction, controlling the supply of heat to the wood until the exotherm is complete and maintaining the internal temperature of the wood below 170° C.
   (f) removing the circulating fluid and allowing the acetylated wood to cool to ambient temperature.

* * * * *

UNITED STATES PATENT AND TRADEMARK OFFICE
CERTIFICATE OF CORRECTION

PATENT NO.      : 8,512,815 B2
APPLICATION NO. : 12/865571
DATED           : August 20, 2013
INVENTOR(S)     : Girotra It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 219 days.

Signed and Sealed this
Nineteenth Day of July, 2016

Michelle K. Lee
*Director of the United States Patent and Trademark Office*